United States Patent [19]
Collard et al.

[11] Patent Number: 5,825,988
[45] Date of Patent: Oct. 20, 1998

[54] APPARATUS FOR PRINTING DIGITAL IMAGE DATA

[75] Inventors: René Francois Albert Collard, Gennep; Peter Johannes Hendrikus Teeuwen, Maasbree, both of Netherlands

[73] Assignee: Oce-Nederland, B.V., Ma Venlo, Netherlands

[21] Appl. No.: 851,344

[22] Filed: May 5, 1997

Related U.S. Application Data

[63] Continuation of Ser. No. 455,982, May 31, 1995, abandoned.

[30] Foreign Application Priority Data

Jun. 7, 1994 [NL] Netherlands ............................ 9400918
Dec. 22, 1994 [EP] European Pat. Off. .............. 94203730

[51] Int. Cl.⁶ .................................................. G06K 15/00
[52] U.S. Cl. .......................................... 395/112; 395/115
[58] Field of Search ..................................... 395/112, 113, 395/114, 115, 116, 101, 117, 792, 109, 110, 111; 358/468, 448, 498, 403, 404, 444, 402, 407, 296, 44.2, 434, 437; 707/792, 530; 347/5, 14, 142; 399/8

[56] References Cited

U.S. PATENT DOCUMENTS

| | | | |
|---|---|---|---|
| 4,843,571 | 6/1989 | Notermans et al. | 395/117 |
| 5,161,037 | 11/1992 | Saito | 358/468 |
| 5,287,194 | 2/1994 | Lobiondo | 395/114 |

FOREIGN PATENT DOCUMENTS

| | | |
|---|---|---|
| 3621543 | 1/1987 | Germany . |
| 3269756 | 12/1991 | Japan . |
| 4317251 | 11/1992 | Japan . |
| 6098122 | 4/1994 | Japan . |
| 6103208 | 4/1994 | Japan . |
| 6133124 | 5/1994 | Japan . |
| 2248129 | 3/1992 | United Kingdom . |
| 89/06024 | 6/1989 | WIPO . |
| WO8906024 | 6/1989 | WIPO . |

*Primary Examiner*—Edward L. Coles, Sr.
*Assistant Examiner*—Dov Popovici

[57] ABSTRACT

A printer for digital image information, wherein supplied data files containing image data for printing can be stored in a memory and are not printed until an operator has given a print command by means of a key on a control panel, the data files in the memory being listed on a display in the control panel for an operator to select one for printing before giving the print command, and wherein before giving this command, the operator can optionally adjust the printer settings in order to obtain a print of the required appearance, the printer also being provided, if required, with a scanner for scanning documents, thus functioning as a copying machine, in which case printing and copying become essentially similar functions with identical operation.

19 Claims, 6 Drawing Sheets

APPARATUS FOR PRINTING DIGITAL IMAGE DATA

This application is a continuation of application Ser. No. 08/455,982 filed on May 31, 1995, now abandoned.

BACKGROUND OF THE INVENTION

1. Field of the Invention

The present invention relates to an apparatus for printing and, more specifically, to a printing apparatus capable of producing prints on the basis of digital image data from a standard work station program upon command. Such image data for printing is normally supplied to the printer in coded form, that is in a form which describes a document for printing in accordance with a page description language, such as Postscript, and also raster files (bitmaps) in compressed form, e.g. in accordance with run length compression.

2. Discussion of Related Art

An apparatus of this kind is known from International Patent Application No. WO 89/06024. In this known apparatus, data files supplied from an external source are stored in the memory and identification data and printing process specifications, such as the format of the printing paper, are extracted from each data file. A check is then made whether the apparatus settings for a given data file satisfy the said specifications. If so, the data file is immediately formatted and printed. If not, an indication is given on the control panel to show that an operator must take action in order to have the apparatus satisfy the specifications. If the operator has completed that task, then the data file is printed immediately and automatically.

The disadvantage of the known apparatus is that the conventional workplace software, i.e. at the work station where the data file for printing is created, is only summarily provided with functionality for setting printing specifications. Many printers can in principle be equipped with all kinds of finishing functions, such as providing covers, stapling, interposing blank sheets, sorting, and so on, which are generally known from copying machines, but these are not adaptable to operating from a standard work station program. In the case of specifications which can be operated from the work station, the operator may wish to change the finish or the appearance of the printing when he sees the print. In that case he has to return to his work station to change the specifications and then give a print order from there again.

Another disadvantage of direct printing of supplied data files is that the prints from different owners/senders are processed in the order of arrival and deposited in the machine tray or trays, so that the owner has to look for his prints among those of others.

SUMMARY OF THE INVENTION

Therefore, it is an object of the present invention to provide an apparatus for printing digital image data which overcomes the above-noted disadvantages.

A further object of this invention is to provide a printing apparatus which is adaptable to working from a standard work station program.

The foregoing objects and others are accomplished in accordance with the present invention, generally speaking, by providing a printing apparatus whereby print jobs are stored solely in the memory, and printing is held up until the owner/sender of the data file gives a printing command by means of a button on the printer. Thus, the apparatus according to the present invention is characterized in that a control unit is adapted to have any image data file printed when and only when it has received a print command for that purpose from an operator by way of the operating means.

The printing apparatus of the present invention comprises an operating unit provided with an operating means, at least one inputting unit for receiving, from an external source, data files for printing, a memory device, a printing unit for printing image data files on an image support, and a control unit connected to the operating unit and also connected to the printing unit in order that image data files in the memory device can be printed by the printing unit.

In a first embodiment of the present invention, the inputting unit stores a received data file in the memory device and, only after the print command from the operating means is received, the control module converts the received data file by a processing unit for that purpose, into a printable image data file and then printed by the printing unit.

In an alternative embodiment of the present invention, a data file received from the external source is immediately converted into a processed image data file, which is then stored in a storage device, but then printing is again held up until an operator command is received from the control panel of the printer. The processed image data may be directly suitable for printing without any further data processing, but may also have an intermediate formal which can rapidly be processed into directly suitable image data.

In either embodiment it is possible, without adapting the work station at which the document for printing has been prepared, to make prints with a special finish. In addition, the user can himself supervise the finishing of the print jobs. This obviates trouble which is not unusual with conventional printers, as when one's own print has to be looked for in a stack of prints of other users or because the order has not been executed because the stock of printing paper has been exhausted. If required, the apparatus can be so devised that after a data file has been printed the user can have the data file reprinted, but with different finishing specifications.

In a further embodiment of the apparatus according to the present invention the control unit is provided with means for creating an inventory of data files stored in the memory device and to present these data files via the operating unit to an operator for selection, and is adapted to have a data file, as selected by an operator, printed. With this embodiment it is possible, even if different people use the printer, to supervise the stored data files for printing. Inputting units may be in the form of a network connection or a reader for data storage media, such as floppy disks.

The apparatus according to the present invention can also be equipped with an electro-optical scanning unit or scanner by means of which a digital copying function is added to the printing function. In a combined copying and printing machine of this kind the operating concept according to the invention also offers the facility of executing both copying and print jobs on one machine in a clear and socially acceptable manner without annoying users, for example, as when a user wishes to make a copy on the machine a printing job of another user (possibly far away) is just starting.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DISCUSSION

Figure 1:
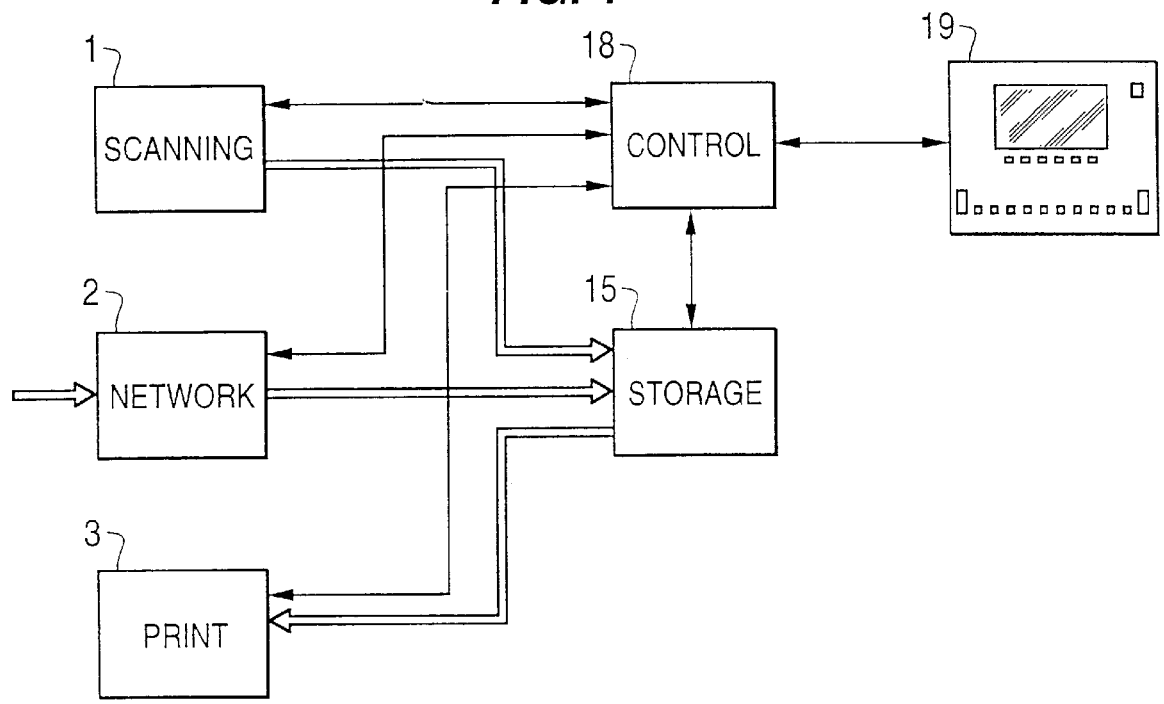
FIG. 1 is a diagram of an apparatus according to the invention.

FIG. 1 shows an image reproduction apparatus according to the present invention. The instant apparatus comprises a scanning means 1 for the electro-optical scanning of a document and for delivering digital image information corresponding thereto, an inputting means 2 for inputting image information from an external source, and a printing unit 3 for printing digital image information on a support material. Both the scanning unit 1 and the inputting unit 2 are connected to a central storage means 15 for storing image information, which is in turn connected to the printing unit 3. They are also connected to a central control unit 18, which is also connected to an operating unit 19 with operating elements and a VDU for use by an operator.

Figure 2:
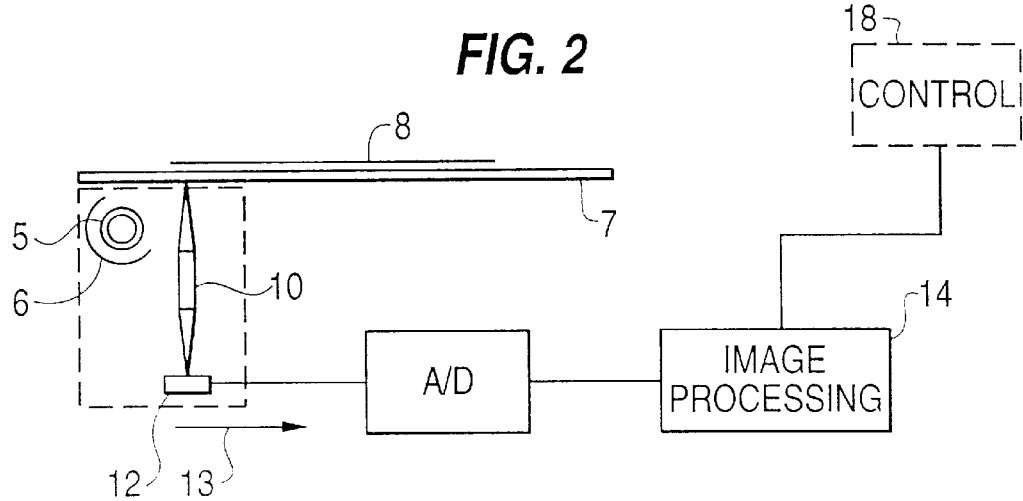
FIG. 2 is a diagram of an electro-optical scanner as used in the apparatus of FIG. 1.

The scanning unit 1 is shown in greater detail in FIG. 2. The scanning unit 1 is provided with a tubular lamp 5 and a reflector 6 co-operating therewith, to illuminate a narrow strip of a document 8 placed on window 7. The scanning means also comprises an array 10 of imaging glass fibers (a "selfoc-lens array") by means of which the light reflected by the document is projected on to a sensor array, e.g. a CCD array 12. During scanning, the scanning means 1 is advanced by drive means known per se (not shown) at a uniform speed in the direction of arrow 13, so that the document 8 is scanned line-wise by the CCD array 12. Thus, each image dot of the document is converted to an analog signal corresponding to the grey scale value of that image dot. The analog signal is then converted by an A/D converter to a digital signal for each image dot, whereupon the digital signals (image data) are fed to an image processing device 14. In the latter device the image data are subjected to one or more image processing operations known per se (thresholding, dithering, histogramming, enlargement, reduction, rotation, etc), to bring them into a form suitable for controlling the printing unit 3. The scanning unit can also be provided with an automatic document feeder (ADF) not shown in the drawings. Units of this kind are generally known so that no detailed description is considered necessary.

Figure 3:
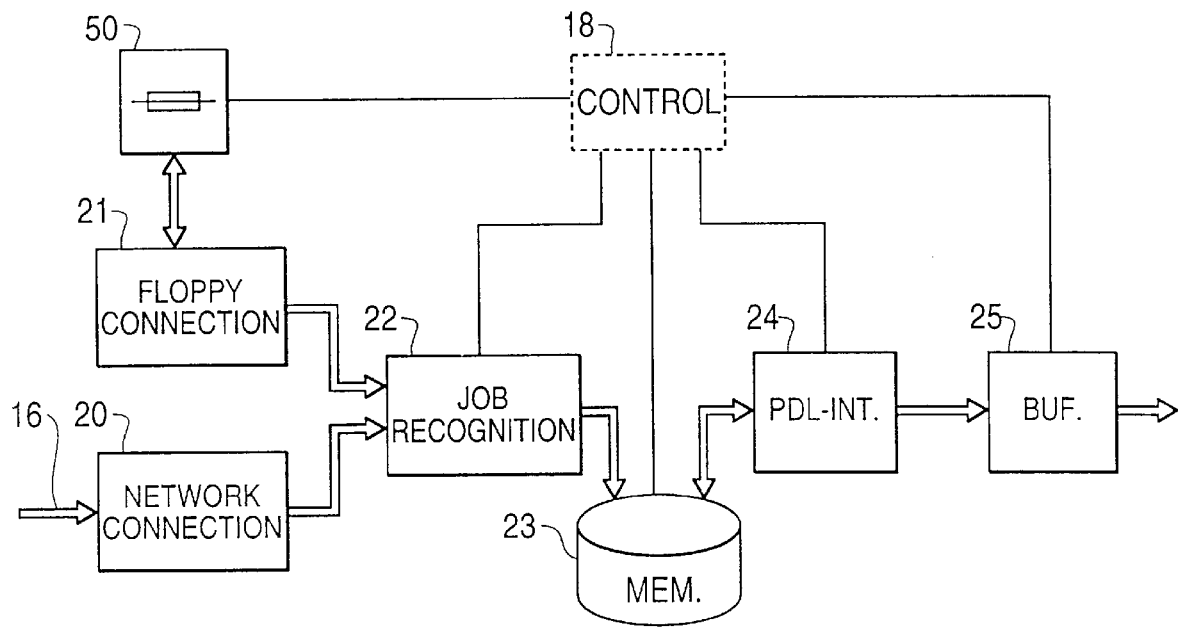
FIG. 3 is a diagram of an inputting device for digital image information from an external source as used in the device of FIG. 1.

The inputting unit 2 for digital image information from an external source, i.e., a front-end feeder, is shown in FIG. 3. This unit is provided with connection units to external data sources. A first connection is formed by a network connection unit 20 connected to an external network 16 to which a number of work stations can be connected for example. These work stations can transmit data files in various generally used formats (page description languages such as PCL, PostScript, etc.) via network 16 to have them printed. The technique of networks and sending data files over such networks is generally known and, therefore, there is no need to explain them. The inputting unit 2 is also provided with a floppy disk unit 50 disposed in or in the vicinity of the apparatus, enabling users to have data files which are stored on a floppy disk printed. The floppy disc unit 50 is connected to a connection unit 21 of the front-end 2 for interpreting the signals from unit 50.

Connections 20 and 21 are both connected to a job recognition module 22 which is in turn connected to a hard disc 23. Module 22 determines in respect of each data file supplied, the page description language (PDL) in which it has been prepared and extracts identification data contained therein.

The memory disc 23, which is intended for interim storage of a supplied data file, is also connected to PDL interpreter 24 for converting a data file coded in a page description language into a form suitable for processing by the printer unit 3. The PDL interpreter 24 is connected via a buffer 25 to the central storage means 15. The job recognition module 22, the memory disc 23 and the PDL interpreter 24 are also each connected to the control unit 18.

For a description of the printing unit 3 reference will be made to FIG. 4. This apparatus is provided with an endless photoconductive belt 20, advanced in the direction of arrow 24 at a uniform speed by means of drive and guide rollers 21, 22 and 23 respectively. By means of the processed image data presented from storage means 15 an LED array 25 is so controlled that the photoconductive belt 20 is exposed line-wise and image-wise after it has been electrostatically charged by a corona device 30. The latent charge image formed on the belt 20 by the exposure is developed with toner powder by means of a magnetic brush device 31 to produce a toner image which is then brought into contact with an endless intermediate belt 32 under pressure in a first transfer zone, belt 32 being made of or covered with an elastic and heat-resistant material, e.g. silicone rubber. In these conditions the toner image is transmitted by adhesion forces from the belt 20 to the belt 32. After this image transfer, any toner powder residues remaining are removed from the photoconductive belt 20 by means of a cleaning device 33, whereafter the belt 20 is ready for fresh use.

The intermediate belt 32 is trained over drive and guide rollers 34 and 35, belt 32 being heated in these conditions to a temperature above the softening temperature of the toner powder, e.g. by an infra-red radiator disposed inside roller 35. While the belt 32 with the toner image thereon is being advanced, the toner image becomes tacky as a result of the heating. In a second transfer zone between the belt 32 and a pressure roller 36, the tacky toner image is transferred under the influence of pressure and simultaneously fixed on a copy sheet fed from one of the reservoirs 37 or 38.

The resulting copy can finally be deposited in a tray 39 or be fed by a deflector element 40 (placed in the position indicated by broken lines) to an inverting device 41 in which the copy sheet is turned over, whereupon it is re-fed to the second transfer zone between the belt 32 and the pressure roller 36 in order to be printed with a toner powder image on the other side in the transfer zone and then deposited in the tray 39.

Figure 4:
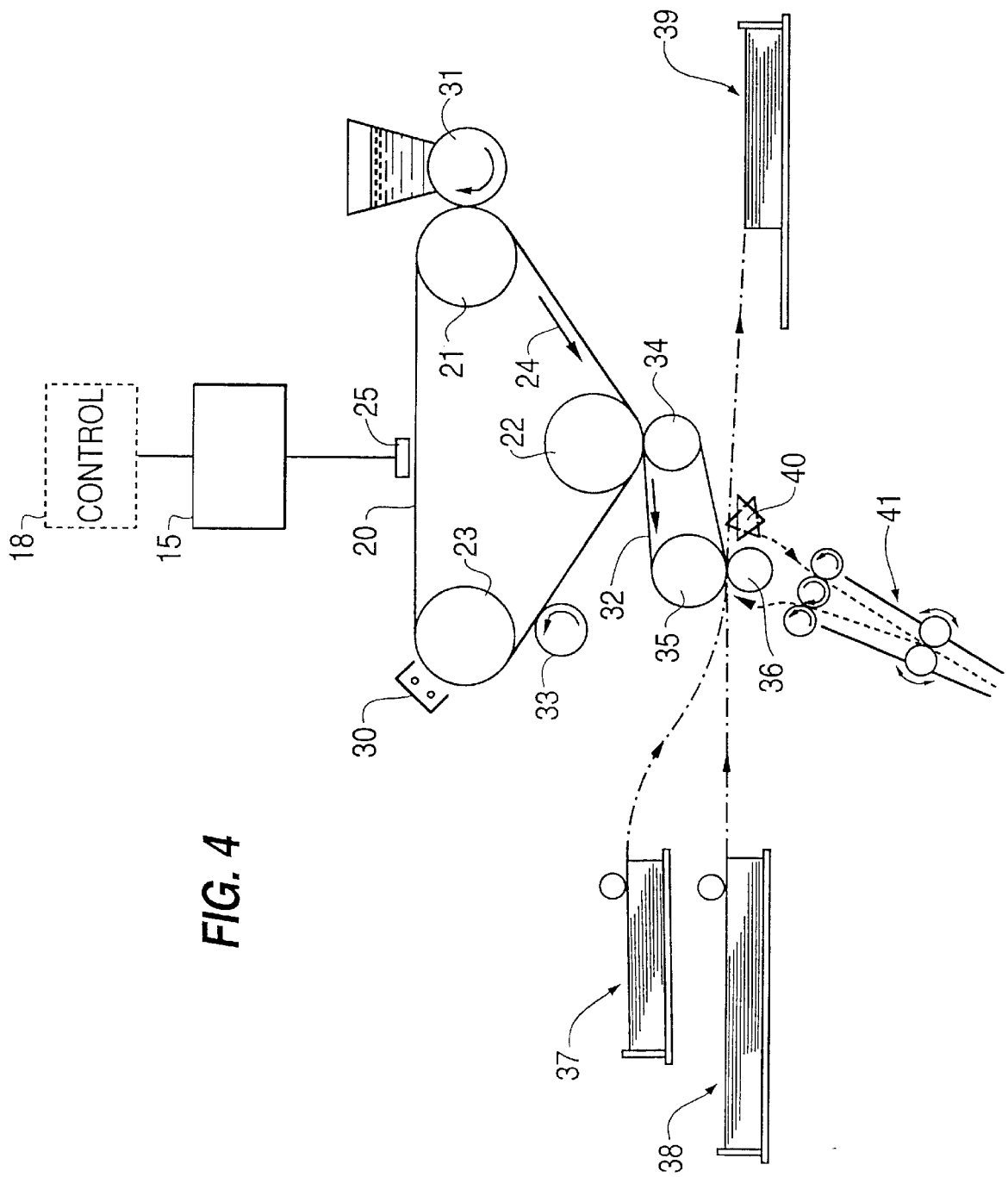
FIG. 4 is a diagram of a printer unit as used in the apparatus shown in FIG. 1.

FIG. 4 shows only two copy sheet reservoirs 37 and 38 but of course the number of reservoirs can be expanded so that different formats of copy sheets (e.g. A5, A4 and A3 and also other formats, e.g. American formats) can be presented. In addition, it is necessary to be able to present the different copy sheet formats in different orientations, namely longitudinal transport (with the longest peripheral side in the direction of transit) or transverse transport (with the shortest peripheral side in the direction of transit) so that copies of one and the same copy sheet format can be made with the image information orientation selectively in the direction of transit of the copy sheet through the printing apparatus or perpendicularly thereto. Various parts of the printing apparatus 3 are controlled by the central control unit 18, either directly or by means of sub-control modules.

Figure 5:
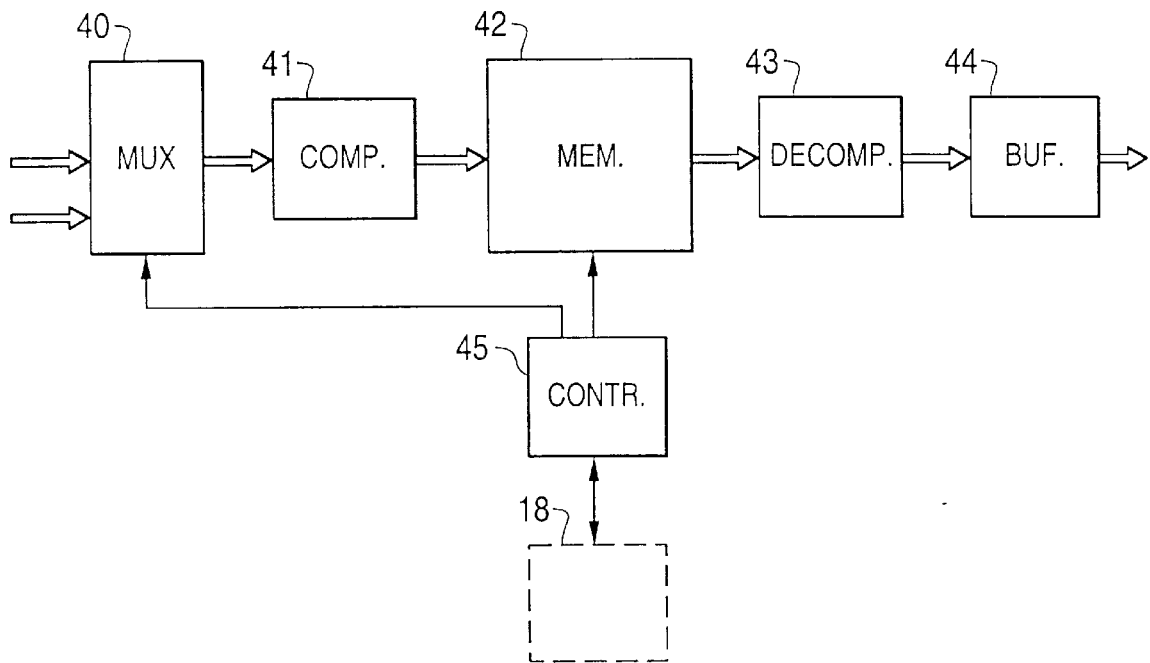
FIG. 5 is a diagram showing a central storage means as used in the apparatus of FIG. 1.

The central storage means 15 is shown in FIG. 5 and comprises an input multiplexer 40 in turn connected to the various signal sources, i.e. scanning unit 1 and inputting unit 2, and also to a data compression device 41. The latter is also connected to a memory 42 which, in turn, is connected to a data decompression device 43. The latter is also connected via a buffer circuit 44 to the printing apparatus 3. The memory 42 and the input multiplexer 40 are also connected to a control circuit 45 which is itself connected to the central control unit 18.

Image data supplied by the scanning unit 1 or inputting unit 2 are passed to compression device 41, in which for each scanned line of the document 8 the image data are compressed in a manner known from the art (e.g. run length coding). The compressed data are then stored in memory 42. In this way, the image data of all the documents required for a given copying or printing job are stored line by line in memory 42. In this description, the term "document" denotes a page. A copying or print job may comprise a set of documents which may or may not belong together.

The start and end addresses of the image data of each document stored in the memory 42, inter alia, are updated in the control circuit 45 of the central storage means. After a set of documents of a copying or print job or part thereof has been stored in the memory 42 in the manner described, the various processing functions of the printing apparatus 3 can be started by the control unit 18. In these conditions, the latter orders the control circuit to read out of the memory 42 the image data required for the copying or print job, decompresses them by decompression device 43, and feeds them to the printing apparatus 3 for processing to give a physical print.

The apparatus thus described is suitable for copying documents, by scanning them electro-optically and processing the resulting digital image data and printing the same. In addition, the apparatus can print digital data files supplied from an external source, either via the network or by means of a floppy disk, by interpreting such files and converting them into raster image data which are then passed to the printing apparatus. The operation of the two functions is largely identical. Both print jobs and copy jobs are executed only after a command for the specific purpose has been given on the machine control panel.

The procedure when a print job arrives via the network is as follows. A data file for printing, fed by a work station via the network, is passed by the network connection unit 20 to the job recognition module 22. This extracts from the file a number of predetermined identification data, checks the file for recognition of the page description language (PDL) used, and passes these identification data and PDL to control unit 18. The file is then stored unchanged on memory disc 23, whereafter the apparatus passes into the stand-by condition. In network systems, transmitted data files are always provided with identification data. This data usually contains the name of the sender (owner) and that of the file itself. In the case of print jobs, extra details are frequently added to specify specific settings of the printer. For example, in UNIX systems, a print job is in the form of a command file (for identification and specification) and a data file (for the data for printing). The command file is intended for the UNIX process "line printer deamon" (lpd) which controls printing, but can also be read out by other processes. When the system according to the invention is implemented in a UNIX environment, the required identification data are read from the command file by the job recognition module 22. In this example, the extracted identification data comprise at least the name of the owner and the name of the file itself.

Figure 6A:
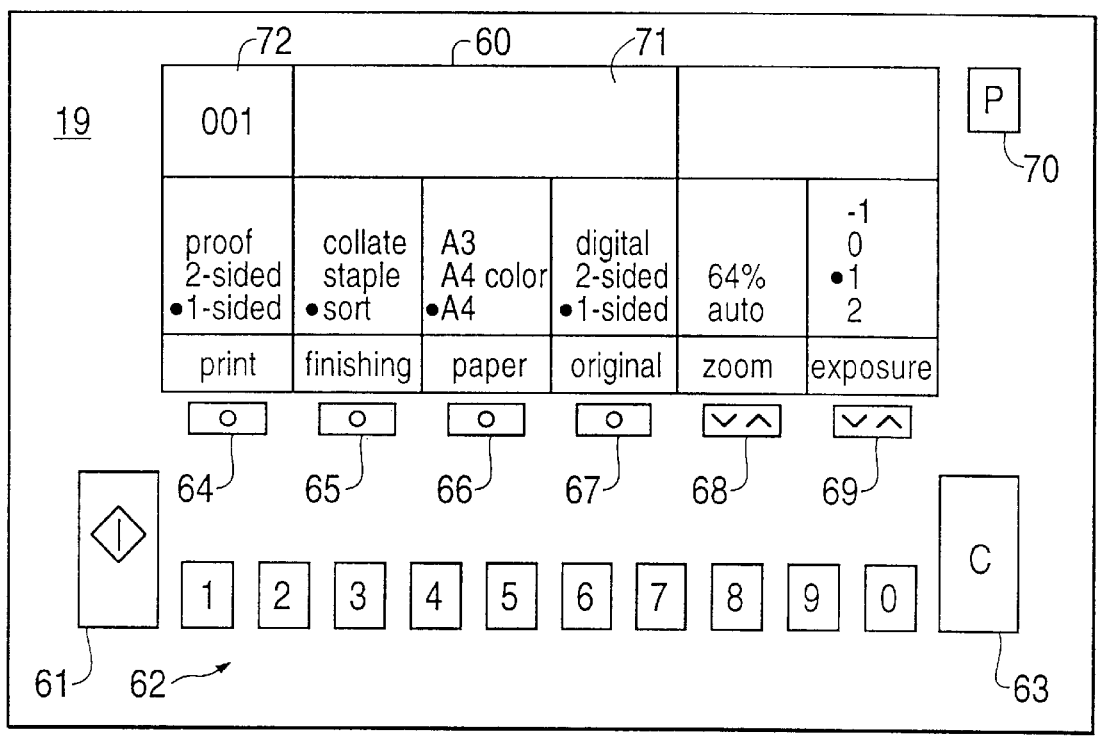
FIGS. 6A and 6B show a control panel as used in the apparatus of FIG. 1.

Control unit 18 manages a list containing the identification data of all data files for printing which are stored on memory disc 23. If a new file is transmitted via the network, then job recognition module 22 extracts the identification data therefrom and passes them to control unit 18. The latter adds this data to the list. Whenever a data file has been printed the control unit 18 removes the identification data of that file from the list. If an operator now wishes to have a given data file printed, he must give a command for that purpose by means of the apparatus control panel 19. This panel is shown in FIG. 6A. Panel 19 comprises a VDU 60, e.g. an image tube or an LCD display, and a number of buttons, namely a start button 61, numeric buttons 62, correction button 63 and selection buttons 64–70. When the apparatus is switched on, the VDU 60 displays an image formed by a number of vertical columns each situated above one of the selection buttons 64–69. Each column relates to a specific basic function of the apparatus and shows the various possible settings for that basic function. For example, the leftmost column is allocated to the use of the printing paper, which can be printed on either one side or both sides. It can also be used to set a test print. The latter will be explained in detail hereinafter. The setting selected at any time, single-sided printing in this case, is indicated by a marker, such as a dark dot, or by highlighting. An operator can select a different setting by actuating a selection button, e.g. in accordance with a cyclic diagram. As a result of a change of a setting, the function of one or more of the other selection buttons may change, because the old function is no longer relevant and other selection possibilities may be required. Different text applicable to the new function will then appear in the relevant column of the VDU 60.

The selection button 70 offers the possibility of calling up another set of functions which cannot be displayed simultaneously with the above-discussed functions because of the limited dimensions of the VDU 60. Generally, these are functions which are not required for a single copying or print job, but which offer the operator more possibilities of obtaining special printing results, or functions which change the operation of the machine. The columns above the buttons 64 (already mentioned), 65 (the sequence of the prints produced and possibly stapling) and 66 (the choice of printing paper) relate to the finishing of the order. The column above button 67 relates to the nature of the original and shows the settings: "1-sided", "2-sided" and "digital". The first two possibilities relate to the copying function of the apparatus and specify the nature of the original. If one of these settings is selected, then the scanning means 1 becomes or remains the source of supply of digital image information activated by the control unit 18. In the "1-sided" setting, only the front of each original document is scanned while in the "2-sided" setting both sides are scanned consecutively. The columns above the buttons 68 and 69 relate to the enlargement setting and/or light/dark control. These functions are sufficiently known from the literature and will not be explained in detail here. The VDU 60 also contains other fields 71 and 72. Field 71 is used to reproduce information concerning a data file for printing. This will be explained hereinafter. Field 72 indicates the number of prints set, as is generally customary on copying machines.

Figure 6B:
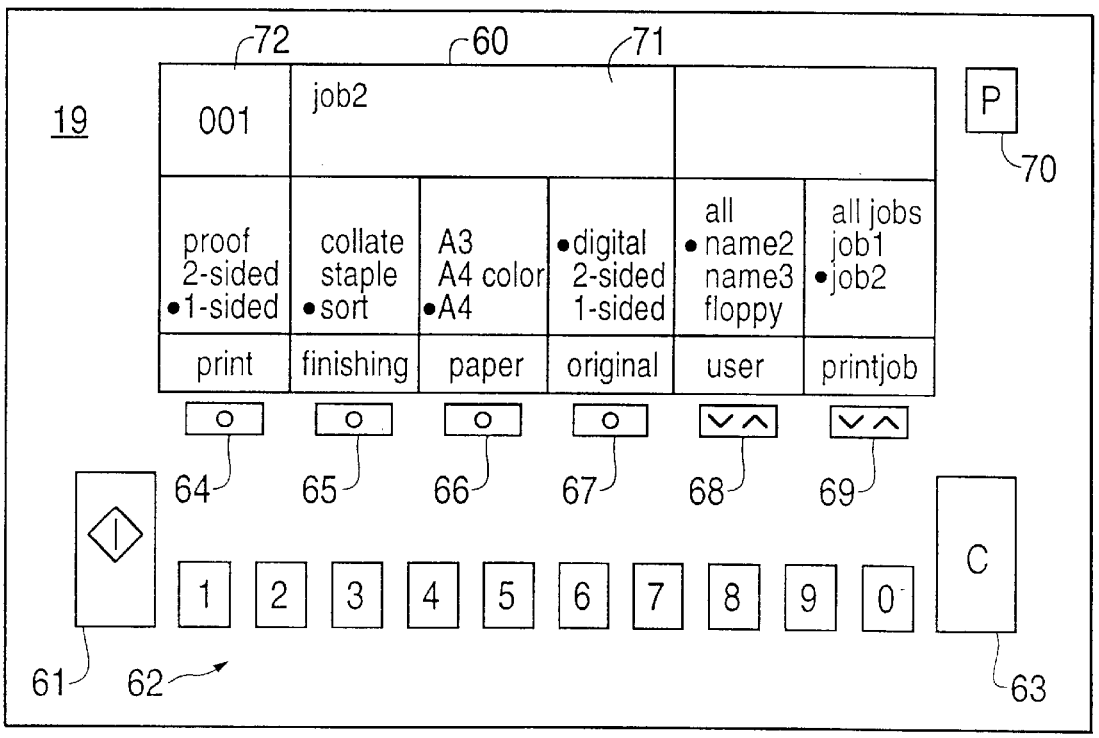
Figure 7:
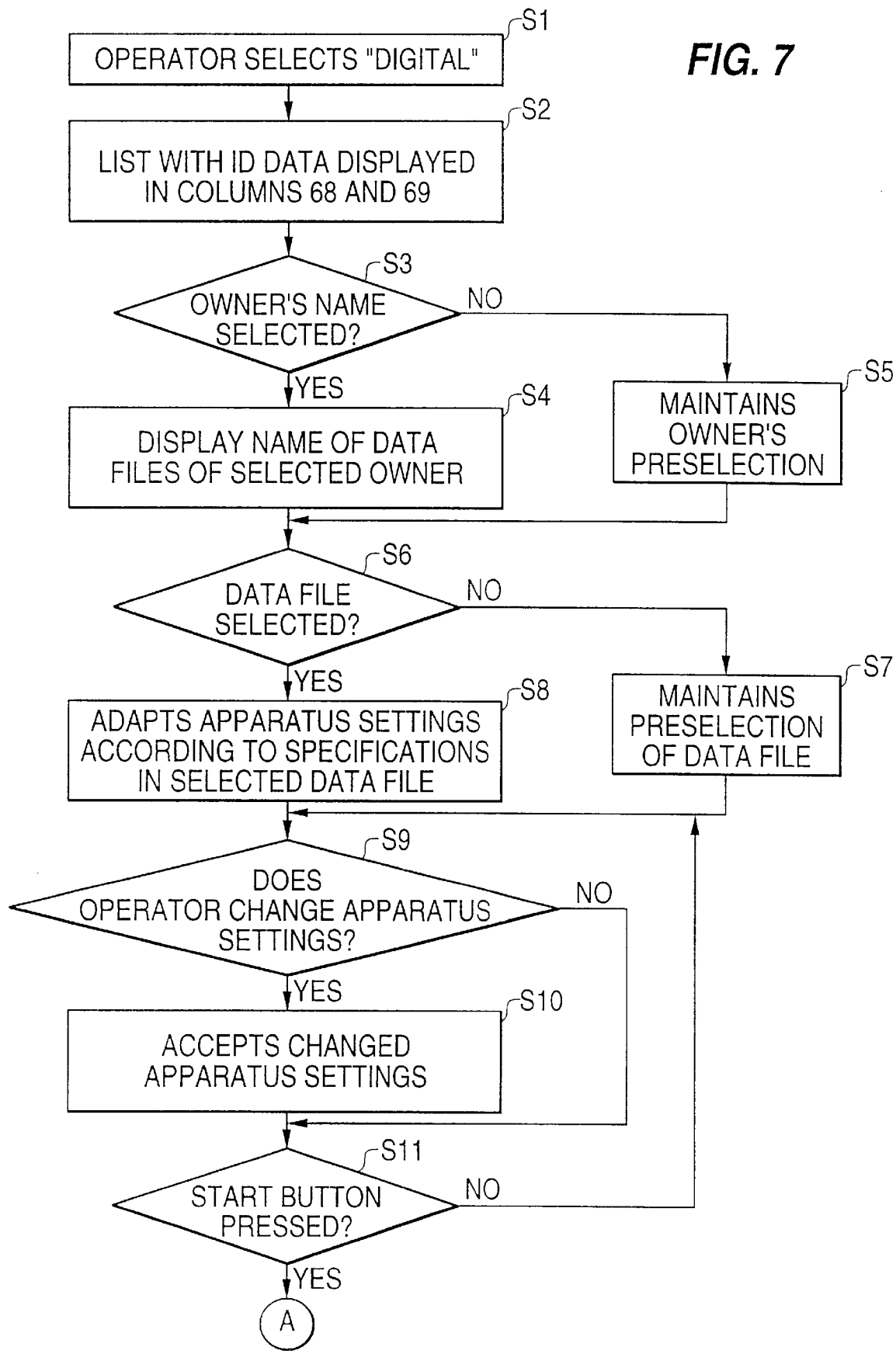
FIGS. 7 and 8 are flow diagrams describing the progress of the printing of digital image information.
Figure 8:
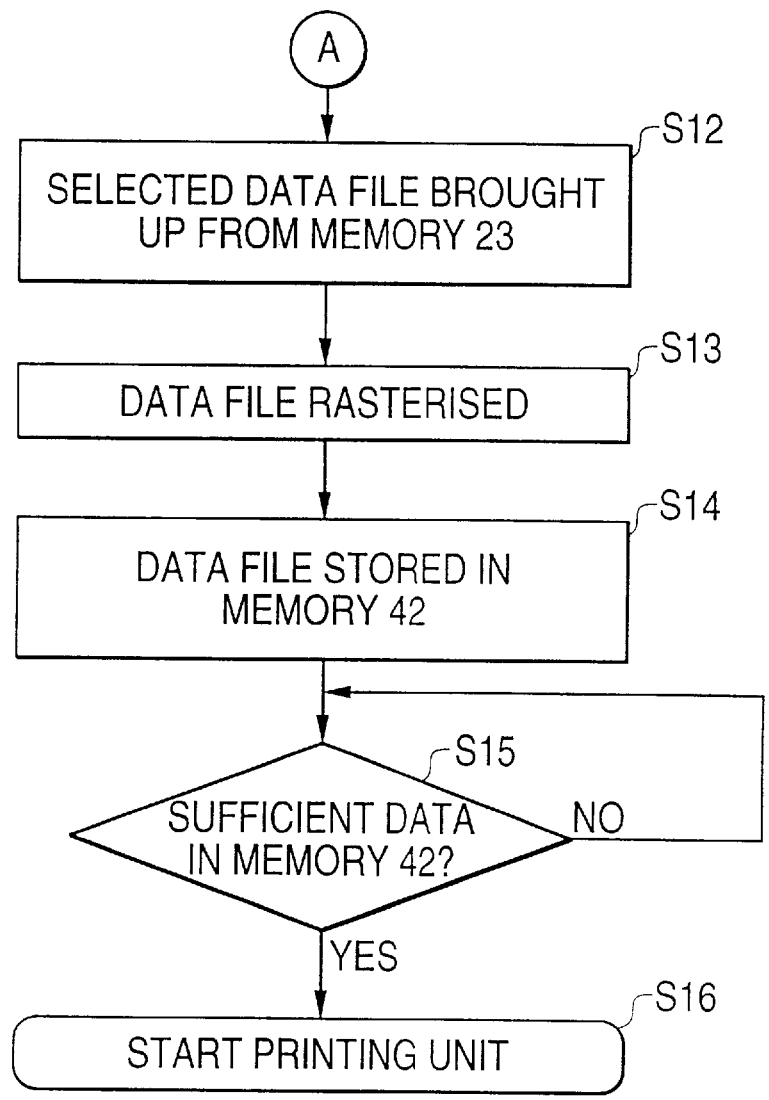

The procedure will now be explained when the setting "digital" is selected, this indicating that the operator wishes to print a data file previously transmitted via the network. In this connection we will refer to FIGS. 7 and 8. In response to selection of the setting "digital" (S1), the control unit 18 checks the list of files for printing and selects those in the owner's name. The control unit now gives the columns above buttons 68 and 69 a new function. The VDU 60 thus has the display shown in FIG. 6B (S2). The column above button 68 shows the names, initials, or other identifications of owners, possibly in abbreviated form, which occur in the list, while the column above button 69 gives the various data files of the owner selected in the left-hand column, possibly in abbreviated form. The first owner and his first file in the list are initially preselected. However, the operator can now select a different owner (S3) by means of the buttons 68. The control unit 18 then fills the column above button 69 with the names of the files of the selected owner in the list (S4), the first file in the list being preselected from those files. Once again the operator can make a different choice with button 69 (S6). More names can be displayed than fit in the column by scrolling. If the operator does not make a selection, then of course the preselected owner and file name are maintained (S5, S7). The complete name of the selected data file is shown in a separate part 71 of the VDU 60.

A data file may be provided with control data relating to the finishing of the prints, e.g. a specific number of prints, stapling of the set of prints, and format of the printing paper. Under UNIX, for example, such data can be selected as an addition to the print command and they are then included in the command file already mentioned. These data are recognized by the job recognition module 22, separated from the data for printing, and transmitted to the control module 18, which includes them as extra information in the list of data files for printing. When the operator selects a given data file, the control unit 18 adjusts the apparatus in accordance with the control data S8 transmitted and shows the data on the VDU 60 of the control panel 19 in the columns above the buttons 64, 65 and 66. However, the operator can select different settings on the control panel before pressing the "start" button 61 (S9). In that case the prints are carried out in accordance with these last settings (S10).

By actuating the "start" button 61 the operator then gives the command for the data file selected as described above to be printed (S11). In response, the control unit 18 gives the PDL interpreter 24 the order to bring up the relevant file from the memory disc 23 (S12), convert it to a printable form (S13) and store it page by page via the buffer 25 in the central storage means 15 (more specifically memory 42, S14). For the purpose of an accounting system in which prints have to be accounted for per sheet by means of an automatic payment unit or by debiting from a group budget, the control unit 18 can access the central memory on each transfer of a converted page. In this embodiment the control unit 18 gives a command for each transfer, after checking whether the automatic payment unit or budget have sufficient credit for the printing (possibly in a plurality of copies if so set) of the page. As soon as the central storage means 15 contains sufficient data for printing of the first page (S15), the printing unit 3 is started (S16) and prints the file on paper in accordance with the selected machine settings.

The apparatus is also adapted first to make a test print or proof for a print job in which a file has to be printed a number of times, in order that the appearance of the resulting print may be assessed. Normally, after completion of a print job the data file is automatically erased from the memory 42 of the central storage means 15, but when a proof is taken this is not the case, so that the file remains available (and selected) for printing, if required after different finish settings have been selected. Making a proof is a function which can be selected by selecting the option "proof" by means of button 64 on the control panel 19.

The apparatus can also be provided with an access control to the list of stored files. This is intended for users who regularly wish to print confidential information. In that case, the control unit 18 can be provided with a password check, which is programmable by means of functions which can be called up via button 70 on the control panel. For certain programmed owners' names, no names of stored files are shown in the column above button 69. If such an owner's name is selected in the column above button 68, control unit 18 asks for an access code via a message in part 71 of the VDU. After the operator has keyed in this code by means of the numeric keys 62, the control unit 18 checks this code with the preprogrammed code stored in a memory for the associated owner's name and, in the event of agreement, it displays the files stored for that owner on memory disc 23 in the column above button 69 and enables them to be selected.

For printing data files from a floppy disk, the procedure is as follows. If a user wishes to have a data file printed from a floppy disk, he inserts the floppy disk in unit 50. This detects the presence of the floppy disk and gives a signal to the control unit 18, which instructs the unit 50 to read out the floppy disk and automatically select the "digital" original setting in the column above button 67 on control panel 19. The data read out are passed via connection unit 21 to job recognition module 22, which extracts the identification data from the read data files (the floppy disk may contain more than one file), whereafter the files themselves are stored unchanged on memory disc 23. The identification data of the files on the floppy disk are included by control unit 18 in its already written list of data files for printing. The term "floppy" is now included in the column above button 68 on the control panel (FIG. 6B) and automatically preselected. In the column above button 69 the name of the data file or, if the floppy disk contained more than one data file, the names of all these files are displayed, the first thereof being preselected. By pressing the start button 61 the operator then gives the order for the selected file to be printed. The procedure is exactly the same as that in the above-described treatment of data files transmitted via the network. Of course, the operator can depart from the selection made by the machine by selecting a different file for printing by means of buttons 68 and 69. Of course, the apparatus can also be made suitable for reading out other digital information media, such as optical disks. Processing of data files thereon will be in a similar manner.

In an alternative embodiment, the unit 50 can read out only the data content of the floppy disk without transferring the image data themselves to the memory disc 23. The content data are then passed via job recognition module 22 to control unit 18, which includes them in the list and presents them to the operator. Only when the operator has selected a data file thus presented is the file really read out from the floppy disk, transferred to the memory disc 23, rasterized and printed.

Both columns for selection of a data file for printing (the columns above buttons 68 and 69) also contain a designation "all". When these two settings are made, the control unit arranges the printing of all the data files in the list as stored on the memory disc, in response to a start command, printing being in a sequence such that all the files occurring in the list are printed successively for the next owner. This is convenient for batch printing of print jobs collected on the memory disc 23, because the sets of prints can in this way be deposited in a clearly observed arrangement.

In a second embodiment of the present invention, print jobs are, upon their reception, immediately converted to a printable form and stored in a memory, after which the apparatus passes into a stand-by condition. This same modification may also be used for the floppy disk printing mode. The apparatus of this embodiment has essentially the same components as the one described above in relation to FIGS. 1 to 6B, and most of their functions are also the same as above. However, a data file for printing is now passed to the PDL interpreter 24 immediately, with the memory disc 23 being used for spooling only. The PDL interpreter 24 converts the data file to a printable form, stores the results via buffer 25 in the central storage means 15, and signals the finishing of its job to the control unit 18. The latter, which has already added the identification data of the job to its list but has not yet made the data available for presentation on the VDU 60 of the control panel 19, now makes the data available and selectable for an operator. Upon actuation of the "start" button 61, the control module 18 starts up the printing unit 3 for printing the selected data file in storage means 15 on paper in accordance with the selected machine settings.

It will be understood that especially for the second embodiment described herein the memory 42 of central storage means 15 should preferably be of large capacity, for instance a hard disc unit or a combination of a semiconductor memory and a disc unit. On the other hand, this embodiment has the advantage of a faster print job handling once the "start" button has been pressed, because the conversion of the data has already taken place.

In a third major embodiment, the data of a received print job are immediately converted into an intermediate format, which takes less storage space and yet can be converted into printable data in very little time. This intermediate format data are formed by PDL interpreter 24 and may be stored on memory disc 23. No further action follows until an operator selects a file and presses the "start" button 61. Then, a further module of PDL interpreter 24 processes the file into printable form and passes the results to printing unit 3 for printing.

The machine thus described is also adapted to be set to a state which behaves as a conventional network printer sequentially finishing all the print jobs arriving via the network. A data file for printing is passed by the network connection unit 20 to the job recognition module 22, which extracts from the file the identification data and the PDL used for the purposes of a banner page which is added as the first page to a print set. The job recognition module 22 passes the extracted information to control unit 18 and then sends the file unchanged for storage on memory disc 23. The PDL interpreter 24 is set by the control unit 18 to the PDL used and then on command converts the file into printable image data and transmits the data page-wise, via buffer 25, to the central storage means 15. Under these circumstances, the first page transmitted is the banner page with the data extracted by job recognition module 22. On command from the control unit 18 the printing unit 3 prints the pages on sheets of paper. In this condition of the machine, copying and printing from a floppy disk in unit 50 is blocked. This condition can be set by means of a selection function on the control panel, such function being called up by the button 70. If required, a switch can also be used for this selection.

The apparatus can also be so devised that for some owners (senders) the print jobs are finished immediately while for other owners the data files are stored and are not printed until a command for this is given from the control panel. In this construction the control unit 18 is provided with a list of owners' names stored in the memory and, for each owner's name, the required procedure for print jobs. On arrival of a print job, the control unit 18 compares the identification data transmitted by job recognition module 22 with the said list of owners' names and then determines what is to be done with a print job received. The content of the list can be input by a function on the control panel called up via button 70.

In order to prevent data files supplied via the network and forgotten by their owner from continuing to occupy space unnecessarily on the memory disc 23, the apparatus can be provided with a retention time control, which automatically removes a file from the disk after expiration of a predetermined period, e.g. a day, after it has been supplied. The retention period can, of course, be programmable, with different periods for each owner if required. Further, one or all files on the disk can be erased at a command of an operator, possibly after authorization, by means of an access code.

Although the invention has been explained by reference to the apparatus described above, it is not restricted thereto. Numerous other embodiments are possible within the scope of the claims and these are considered as coming under the scope of protection.

We claim:

1. An apparatus for printing digital image data, comprising:

an operator interface;

a memory device;

at least one inputting unit, connected to said memory device, for receiving, from an external source, data files to be printed and for storing the data files in the memory device;

a printing unit for printing data files; and a control unit, connected to said operator interface, said inputting unit, and said printing unit, for prohibiting the printing of all data files stored by said inputting unit into said memory device until, relative to at least one of said data files in said memory device, said control unit has received a go-ahead print command designating said at least one of said data files from an operator via said operator interface, and for controlling said printing unit to print a data file only if the data file is designated by the go-ahead print command received from said operator via said operator interface.

2. An apparatus according to claim 1, wherein said go-ahead print command presents data file identification information, including at least one of a name of an operator and a name of one of said data files, so as to designate at least one data file to be printed, and said control unit is also operable to control said printing unit to print a data file only if the data file is designated by a go-ahead print command received from the operator via said operator interface.

3. An apparatus for printing digital image data, comprising:

a memory device;

at least one inputting unit, connected to said memory device, for receiving remotely generated data files from an external source to be printed and for storing the received data files in said memory device;

a printing unit, connected to said memory device, for printing data files stored in said memory device;

a local operator interface located near said printing unit;

a control unit connected to said local operator interface for receiving therefrom a print command specifying one of the received data files stored in said memory device;

said control unit further being connected to said inputting unit and said printing unit;

said control unit controlling said printing unit to print the specified data file stored in said memory device to which the print command relates only upon reception of the print command from said local operator interface.

4. An apparatus according to claim 3, further including a processing unit, connected to said memory device and said printing unit, for converting received data files into printable image data files, wherein said at least one inputting unit is adapted to store a received data file in said memory device and wherein said control unit is adapted to, upon said print command from said local operator interface, control said processing unit to convert a received data file into a printable image data file and have the resulting printable image data file printed by said printing unit.

5. An apparatus according to claim 3, further including a processing unit, connected to said memory device and said control unit, for converting received data files into processed image data files, wherein said processing unit is adapted to store a processed image data file in said memory device and wherein said control unit is adapted to, upon said print command from said local operator interface, have a processed image data file printed by said printing unit.

6. An apparatus according to claim 4, wherein said control unit includes means for creating an inventory of received data files stored in said memory device and for presenting identification data of said data files via said local operator interface to an operator for selection, whereby said control unit is adapted to have converted and printed, in response to said print command, a data file stored in said memory device as selected by the operator prior to said print command.

7. Apparatus according to claim 5, wherein said control unit includes means for creating an inventory of processed image data files stored in said memory device and for presenting identification data of said image data files via said local operator interface to an operator for selection, whereby said control unit is adapted to have printed, in response to said print command, a processed image data file stored in said memory device as selected by the operator prior to said print command.

8. An apparatus according to claims 6 or 7, wherein said inputting unit includes means for extracting identification data from a received data file and for transmitting said identification data to said control unit.

9. An apparatus according to claim 8, wherein said at least one inputting unit includes a network connection module for connection to a digital network.

10. An apparatus according to claim 8, wherein said at least one inputting unit includes a device for reading a non-volatile data storage medium.

11. An apparatus according to claim 3, wherein said print command includes at least one print-format parameter.

12. An apparatus according to claim 3, wherein said control unit is adapted automatically to erase from said memory device data files stored therein after expiration of a predetermined period.

13. An apparatus according to claim 3, wherein said control unit is adapted, by a command from said local operator interface, to be set to a state in which said control unit is operable to cause received data files to be converted and printed without awaiting a print command from said operator interface.

14. An apparatus according to claim 3, 4 or 5, further including a scanning unit for electro-optical scanning of a document and for generating digital image data therefrom, and a second processing unit, connected to said scanning unit, for converting said digital image data into printable image data files, said second processing unit being also connected to said printing unit and for delivering printable image data files thereto, and wherein said control unit is also connected to said scanning unit and to said second processing unit, and includes means for, on receipt of a copying command given via said operator interface, starting said scanning unit, wherein said image data generated by said scanning unit is converted by said second processing unit into printable image data files, and said printing unit is caused to print said printable image data files.

15. An apparatus according to claims 6 or 7, wherein said means for creating an inventory and for presenting data files stored in said memory device is also adapted to provide an operator with a choice of having all the stored data files printed successively.

16. An apparatus according to claims 6 or 7, wherein said control unit includes means for verifying an operator's identification code received from said operator interface, and wherein said means for creating an inventory and for presenting data files stored in said memory device is adapted, at least in respect of predetermined ones of said data files, to present these data files to an operator for selection only after said control unit has verified and approved said identification code.

17. An apparatus according to claim 3, wherein said at least one inputting unit includes a network connection module for connection to a digital network.

18. An apparatus according to claim 3, wherein said at least one inputting unit includes a device for reading a non-volatile data storage medium.

19. An apparatus according to claim 18, wherein said data storage medium is a floppy disk.

* * * * *